H. B. SMITH.
Fruit-Drier.
No. 198,422. Patented Dec. 18, 1877.
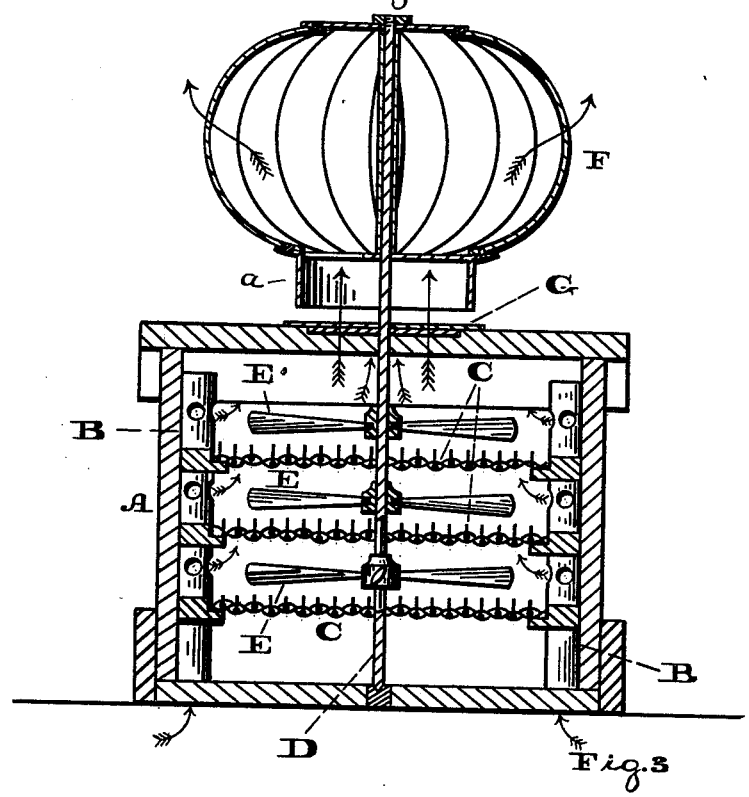
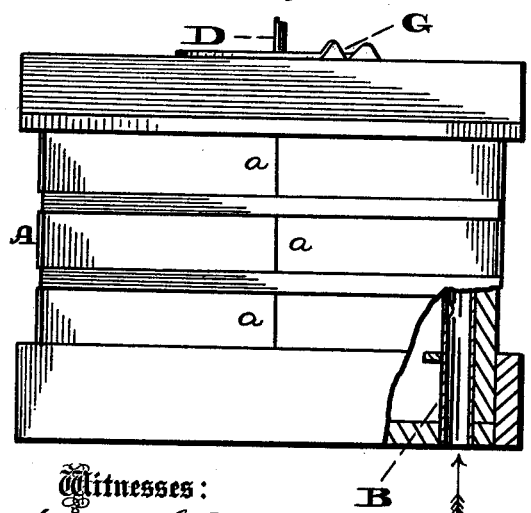
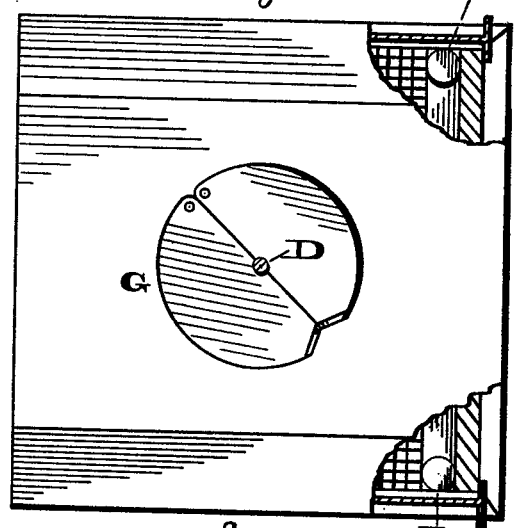
Witnesses:
Lewis S. Brous?
A. P. Grant.
Inventor:
H. B. Smith
by John A. Wiedersheim
Attorney.

UNITED STATES PATENT OFFICE.

HIRAM B. SMITH, OF PHILADELPHIA, PENNSYLVANIA, ASSIGNOR OF ONE-HALF HIS RIGHT TO C. E. PAINE & SON, OF SAME PLACE.

IMPROVEMENT IN FRUIT-DRIERS.

Specification forming part of Letters Patent No. 198,422, dated December 18, 1877; application filed November 2, 1877.

*To all whom it may concern:*

Be it known that I, HIRAM B. SMITH, of the city and county of Philadelphia, and State of Pennsylvania, have invented a new and useful Improvement in Fruit-Driers, which improvement is fully set forth in the following specification and accompanying drawings, in which—

Figure 1 is a central vertical section of the drier embodying my invention. Fig. 2 is a side view of a portion thereof, also partly broken away, and sectional. Fig. 3 is a top view of a portion thereof, also partly broken away, and sectional.

Similar letters of reference indicate corresponding parts in the several figures.

My invention relates to that class of fruit-driers in which an upward current of heated air is employed to dry fruit and vegetables placed upon foraminous trays within the drying-chamber.

My improvement consists, essentially, in the means for forcing the air through and over the trays, expelling the vapors, and inducing a current through the drying-chamber, substantially as hereinafter set forth and claimed.

Referring to the drawings, A represents a chamber or house, within which are arranged vertical pipes or drums B, for the passage of heated air, leading into the chamber, said pipes communicating with a furnace or other suitable heating medium. C represents trays or shelves, which are supported within the chamber, and designed to hold the fruit or vegetables to be dried. D represents a shaft, which is passed vertically through the chamber, and its lower end is fitted in a step on the bottom of the chamber.

Secured to the shaft are fan-blades or vanes E, which are arranged to alternate with the trays C, and the shaft projects above the top of the chamber, and has there connected to it a ventilator-wheel, F, which is formed of a series of curved plates overlapping one another, with intervening spaces, and connected at top and bottom to disks or arms on the shaft, so as to form a hollow spherical body, the bottom *a* whereof is open.

This bottom end or base is composed of a cylindrical flange, and is adapted in area to the area of the opening or upper air-passage through the drying-chamber, so that the liability of a current of external air coming in contact with the current of heated air passing up into the fan-wheel will be avoided.

The top of the chamber has an opening occupied by doors or valves G, said opening being below the open bottom of the wheel F, so that when the doors are opened the volatile matters from the chamber will enter the wheel, and on escaping from the wheel will cause the rotation of the latter. This rotation may be assisted by the action of the wind striking the wheel externally. The chamber is provided with doors *a*, for access to the interior of the chamber, and the replenishing with and removal of the fruit and vegetables, said doors being closed during the drying operation.

It will be seen that when the heat enters the chamber and is directed into the wheel G through the top opening of the chamber, the consequent rotation of the wheel imparts motion to the shaft D and fan-blades or vane E.

The heat will be thoroughly diffused in the chamber, and passed through and over the trays, and the vapors that rise from the drying articles will be carried off with the heat on its way to the wheel F, whereby the vapors are prevented from condensing within the chamber, and the rapid, thorough, and reliable drying of the articles is accomplished.

It will be noticed that the heat employed to dry the articles, as well as the created vapors, is utilized to cause rotation of the blades or vanes E. The construction of the above-described means for agitating and inducing currents of heated air through the drying-chamber admits of the desired results without shaking the fruit, and thereby displacing it upon the trays, so as to heap it up in spots, and thereby prevent the free circulation of air through the trays, which, in driers where the trays revolve, is a common occurrence.

When it is desired to prevent movement of the wheel F, the doors or valves G will be closed, and said doors or valves may also be used as dampers for regulating the amount of escape of the heated products within the chamber.

Having thus described my invention, what

I claim as new, and desire to secure by Letters Patent, is—

1. In combination with the holding-trays C within the drying-chamber A, the herein-described series of vanes E, alternating with the holding-trays, and revolved by the action of the upward current of heated air upon an exterior fan-wheel upon the shaft D, on which the said vanes are also mounted, substantially as and for the purposes herein specified.

2. In combination with the drying-chamber A, provided with a shaft and vanes adapted to rotate and agitate the hot air between the holding-trays, the spherical fan-wheel F, constructed with an open cylindrical base, and mounted upon shaft D outside of the drying-chamber, and over the upper hot-air passage therein, substantially as shown and set forth.

3. The drying-chamber A, with trays C, and the shaft D, with ventilating-wheel F and fan-blades or vanes E, in combination with the top doors or valves G, substantially as and for the purpose set forth.

H. B. SMITH.

Witnesses:
JOHN A. WIEDERSHEIM,
JNO. A. BELL.